United States Patent [19]
Andersson et al.

[11] Patent Number: 5,603,805
[45] Date of Patent: Feb. 18, 1997

[54] SILICA SOLS AND USE OF THE SOLS

[75] Inventors: Kjell Andersson, Göteborg; Bo Larsson, Partille; Erik Lindgren, Bohus, all of Sweden

[73] Assignee: Eka Nobel, AB, Bohus, Sweden

[21] Appl. No.: 379,630

[22] PCT Filed: Aug. 11, 1993

[86] PCT No.: PCT/SE93/00663

§ 371 Date: Feb. 3, 1995

§ 102(e) Date: Feb. 3, 1995

[87] PCT Pub. No.: WO94/05596

PCT Pub. Date: Mar. 17, 1994

[30]    Foreign Application Priority Data

Aug. 31, 1992 [SE] Sweden ................... 9202502

[51] Int. Cl.$^6$ ............................................. D21H 21/10
[52] U.S. Cl. ....................... 162/168.3; 162/181.2; 162/181.6; 162/183
[58] Field of Search ............... 162/181.6, 181.2, 162/168.2, 168.3, 164.3, 164.6, 183; 252/60, 313.2; 423/327.1, 338, 335

[56]            References Cited

U.S. PATENT DOCUMENTS

| | | | |
|---|---|---|---|
| 2,727,008 | 12/1955 | Iler | 252/313 |
| 2,892,797 | 6/1959 | Alexander et al. | 252/313 |
| 2,974,108 | 3/1961 | Alexander | 252/313.2 |
| 3,533,816 | 10/1970 | Oken | 106/74 |
| 3,922,393 | 11/1975 | Wallace | 427/215 |
| 3,947,376 | 3/1976 | Albrecht | 252/313.2 |
| 3,956,171 | 5/1976 | Moore et al. | 252/313.2 |
| 4,272,409 | 6/1981 | Bergna | 252/455 |
| 4,385,961 | 5/1983 | Svending et al. | 162/175 |
| 4,798,653 | 1/1989 | Rushmere | 162/181.6 |
| 4,927,498 | 5/1990 | Rushmere | 162/168 |
| 4,964,954 | 10/1990 | Johansson | 162/181.6 |
| 5,066,420 | 11/1991 | Chevallier | 252/313.2 |
| 5,100,581 | 3/1992 | Watanabe et al. | 252/313.2 |
| 5,236,623 | 8/1993 | Chevallier | 252/313.2 |
| 5,368,833 | 11/1994 | Johansson et al. | 252/313.2 |
| 5,447,604 | 9/1995 | Johansson et al. | 162/183 |
| 5,470,435 | 11/1995 | Rushmere et al. | 162/183 |

FOREIGN PATENT DOCUMENTS

1446106A1  12/1988  U.S.S.R. ................. 252/313

*Primary Examiner*—Peter Chin
*Attorney, Agent, or Firm*—Ralph J. Mancini; Louis A. Morris

[57]            ABSTRACT

Silica sols with a high content of microgel and particles with a specific surface area within the range 300 to 700 m$^2$/g, preferably 400 to 650 m$^2$/g. The sols can be prepared by acidification or a water glass solution and alkalization at a certain dry content, alternatively to a certain pH. The sols are particularly suitable for use as additives in papermaking in combination with cationic polymers and especially in combination with cationic acrylamide based polymers.

17 Claims, No Drawings

SILICA SOLS AND USE OF THE SOLS

The present invention relates to new silica sols, to a process suitable for preparation of the sols and to the use of the new sols in the production of paper. More particularly the invention relates to new silica sols which have particles of a certain specific surface area and which have a comparatively high amount of so called microgel. The new sols are particularly suitable for use as additives in combination with polymers in the production of paper.

Silica sols, which term is used herein for silica hydrosols, are aqueous systems with very small silica particles which find use in a variety of fields, among other things dependent on the particle size. In the production of paper silica based sols with very small, colloidal, anionic silica particles have found an increasing utilization during the last few years. Silica sols are hereby used as additives to the stock in combination with cationic or amphoteric polymers, mainly for improving retention and dewatering in the production of paper. In the European patent 41056 the use of colloidal silica sols in combination with cationic starch is for example disclosed. In the PCT applications WO 86/00100 and WO 86/05826 combinations of silica sols, with particles where at least the surface groups contain aluminium, and cationic natural polymers and cationic polyacrylamides, respectively, are disclosed. The silica particles are generally stated to have a specific surface area within the range of from 50 to 1000 $m^2/g$. The sols which are used commercially in paper production are of the type which have discrete colloidal particles with a particle size usually of from about 4 to about 7 nm, ie a specific surface area of from about 700 to about 300 $m^2/g$, and above all sols with particles having a specific surface area of about 500 $m^2/g$ have been used commercially. It has generally been considered that sols with particles of the above mentioned size give the best results and they have also been preferred with regard to stability. Quite generally it has been an aim that the silica sols should be as monodisperse as possible, ie that the particles of the sols should be discrete and non-aggregated and have as narrow particle size distribution as possible. At the preparation of sols it has thus been sought to avoid aggregation, ie formation of microgel. According to the PCT application WO 91/07350 silica sols with a certain degree of microgel formation have been developed. These sols are based on particles with a very high specific Surface area and have been found especially useful in combination with polymers in the production of paper. The sols are based on particles with very high specific surface area, from 750 to 1000 $m^2/g$, preferably from 800 to 950 $m^2/g$, and the particles are surface modified with aluminium for stabilization of the high surface area.

According to the present invention it has been found that sols of silica based particles, ie particles based on $SiO_2$, which have a specific surface area within the range 300 to 700 $m^2/g$ and which contain comparatively high amount of microgel give very good effect as concerns retention and dewatering in papermaking. It has especially been found that sols with particles of the given specific surface area and content of microgel according to the invention give substantially improved effect when they are used in combination with cationic acrylamide based polymers in comparison with previously used silica based sols with specific surface area in the same range which substantially contain discrete particles. The content of microgel, or aggregate, can be controlled during the production of the sols.

The present invention thus relates to new silica sols, as further defined in claims, and also relates to a process for the production of the sols and to the use of the sols.

The new sols are characteristic in that they have a high content of microgel, ie a low S-value, and in that the sol particles have a specific surface area within the range from 300 to 700 $m^2/g$. The given specific surface area is measured by means of titration with NaOH according to the method disclosed by Sears in Analytical Chemistry 28(1956):12, 1981–1983. The specific surface area is suitably within the range from 400 to 650 $m^2/g$.

In contrast to known commercial sols with the above mentioned specific surface areas which are used in papermaking the present sols have a comparatively high content of microgel and thus a low S-value. It is assumed that the microgel, the aggregates, to a substantial extent is present in the form of two- or three-dimensional structures, of more less cloud-like formation, of aggregated primary particles. The S-value for the present sols is within the range from 15 to 40 percent by weight and preferably the S-value is within the range from 15 to 35%. The given S-value has been measured and calculated in accordance with what is disclosed by Iler, R. K. & Dalton R. L. in J. Phys. Chem. 60(1956), 955–957. The S-value can be considered as a measure of the degree of aggregate or microgel formation and a low S-value indicates a greater part of microgel and can also be considered as a measure of the $SiO_2$-content of the dispersed phase in percent by weight.

The particles in the present sols can be unmodified silica particles or be silica particles which are surface modified with aluminium. Sols which contain silica which is not aluminium modified are preferred. For aluminium modified particles these are suitably modified to a degree of from 2 to 25 percent, suitably from 3 to 20 percent. With a degree of aluminium modification is meant the part of aluminium atoms which have replaced silicon atoms in the surface of the particles. The degree of aluminium modification is given in percent and is calculated on basis of 8 silanol groups per $nm^2$. This is described by Iler, R. K. in Journal of Colloidal and Interface Science, 55(1976):1, 25–34. The present sols suitably have a dry content, calculated as $SiO_2$, of from about 3 to about 40 percent by weight and the dry content is preferably within the range of from about 5 to about 30 per cent by weight.

It has been found that these new sols which contain anionic particles are useful in the production of paper and similar products and that they herein, in combination with cationic polymers give very good improvement of retention and dewatering. It has particularly been found that the new sols according to the invention which contain particles which are not aluminium modified give a substantial improvement when they are used in combination with cationic acrylamide based polymers in comparison with commercially used such sols which have particles of the same size but in which the particles are substantially discrete. In addition to silica sols as defined in the appended patent claims the present invention also relates to a process for the production of the new silica sols and to the use of the sols as stated in the appended patent claims.

The invention also relates to a process for the production of silica sols which have comparatively low S-values and which have a specific surface area within the range of from 300 to 700 $m^2/g$. According to the invention silica sols are prepared starting from a conventional alkali water glass, potassium or sodium water glass, preferably sodium water glass. The mole ratio of $SiO_2$ to $Na_2O$ or $K_2O$, where $Na_2O$ and $K_2O$ in the following will be given as $M_2O$, in the water glass can, as per se known, be within the range of from 1.5:1 to 4.5:1 and is preferably within the range of from 2.5:1 to 3.9:1. A diluted solution of the water glass is utilized and this suitably has an $SiO_2$ content of from about 3 to about 12 percent by weight, preferably from about 5 to about 10 percent by weight. The water glass solution which usually has a pH around 13, or above 13, is acidified to a pH of from about 1 to about 4. The acidification can be carried out in per se known manner by addition of mineral acids, such as for example sulfuric acid, hydrochloric acid and phosphoric acid or optionally with other known chemicals for acidification of water glass such as ammonium sulphate and carbon dioxide. At addition of mineral acid the acidification is carried out in two steps, a first step to a pH of about 8 to 9, whereafter a certain ripening, ie a particle growth, is allowed to occur before further acidification to a pH of from about 1 to about 4. However, it is preferred that the acidification is carried out by means of acid cation exchangers which among other things lead to more stable products and give almost sodium free acid sols. The acidification is preferably carried out by means of strongly acid cation exchange resins, for example of sulfonic acid type. It is preferred that the acidification is carried out to a pH of from about 2.0 to 4.0 and most preferably from about 2.2 to about 3.0. The acid sol obtained after acidification is then made alkaline. The alkalization can be carried out with conventional alkali such as sodium, potassium or ammonium hydroxide. It is, however, preferred that alkatization is carried out by addition of water glass. Potassium and sodium water glass, particularly sodium water glass, with a mole ratio of $SiO_2$ to $M_2O$ as above described is used in this alkalization step. The $SiO_2$ content of the water glass solutions used for alkalization is suitably within the range of from about 3 to about 35 percent by weight and preferably within the range of from 5 to 30 percent by weight. The alkalization is suitably carried out to a pH of at the lowest equal to 7 and suitably to a pH within the range of from 7.5 to 9. The alkalization is further suitably carried out to a final mole ratio $SiO_2$ to $M_2O$ within the range of from about 20:1 to about 75:1, suitably within the range of from about 30:1 to about 60:1. At the preparation of a sol as above the degree of microgel can be influenced in several ways and be controlled to the desired low value. The degree of microgel can be influenced by salt content, by adjustment of the concentration at the preparation of the acid sol and at the alkalization since in this step the degree of microgel is influenced when the stability minimum for the sol is passed, at a pH of about 5. By prolonged times at this passage the degree of microgel can be directed to the desired value. It is particularly suitable to control the degree of microgel by adjustment of the dry content, the $SiO_2$ content, at the alkalization whereby a higher dry content gives a lower S-value. By keeping the $SiO_2$ content at the alkalization in the range of from 7.5 to 5 percent by weight the S-value can be controlled to the given values 15 to 40%. Another suitable way to control the degree of microgel is by adjustment of the alkalization to a certain pH and the above given pH values to which the alkalization is carried out controls the S-values to lower values at a lower pH. To obtain sols with S-values within the range 15 to 40% the pH at the alkalization is suitably controlled to the range 7.5 to 8.5. At alkalization to this pH-range a suitable $SiO_2$ content is within the range from about 5 to about 6 percent by weight. The acid sol has particles with a high specific surface area, above 1000 $m^2/g$ and usually around about 1300 $m^2/g$. After the alkalization a particle growth starts and thereby a decrease of the specific surface area. After the alkalization a growth process is thus carried out so that the desired specific surface area is obtained. The desired decrease in surface area to the range 300 to 700 $m^2/g$ can be obtained by heat treatment. At heat treatment times and temperatures are adjusted so that shorter times are used at higher temperatures. From a practical point of view it is suitable to carry out heat treatment at temperatures up to about 95° C. during about half an hour up to about 24 hours. When the particles have obtained the desired specific surface area an aluminium modification of the surface can be carried out if desired in order to give particles which have a better charge stability in acid environment than unmodified particles. The modification is an aluminium modification and is carried out by means of an aluminate, sodium or potassium aluminate, preferably sodium aluminate. The aluminium modification of the particle surface is carried out in per se known manner and to a degree of surface modification of 2 to 25%, particularly to a degree of 3 to 20%, as mentioned above. According to the present process silica sols with dry contents of from about 3 to about 40 percent by weight, after optional concentration, can be prepared and the produced sols show very good storage stability, ie they can be stored for several months without substantial decrease of the specific surface area and without gel formation.

The new sols according to the invention are particularly suitable for use in papermaking. The present invention relates also to this use of the sols. As mentioned by way of introduction it is well known to use silica based sols in combination with cationic polymers in the production of paper, first of all in order to get improved retention and dewatering. The present silica sols are utilized in the same manner as earlier known for silica sols with anionic particles and they give, in combination with cationic polymers and amphoteric polymers, a substantial improvement of the retention and dewatering in the production of paper. Even if arbitrary order of addition can be used it is preferred that the polymer is added before the sol. The sols can with good effect be used within the whole pH range 4 to 10 in papermaking. The improved dewatering also results in that the speed of the papermaking machine can be increased and, further, less water need to be removed in the press and drying sections of the machine and a substantially economically improved papermaking process is thus obtained. The substantially improved effect of the present sols with low S-values in comparison with corresponding sols of higher S-values when they are used in combination with cationic acrylamide based polymers should be especially emphasised.

The present invention thus also relates to a process for the production of paper with the characteristic features defined in the claims. The cationic or amphoteric polymers can be natural, ie based on carbohydrates, or be synthetic. As examples of suitable polymers can be mentioned cationic and amphoteric starch, cationic and amphoteric guar gum, cationic and amphoteric acrylamide based polymers, cationic polyethyleneimines, polyamidoamines and poly(diallyldimethyl ammonium chloride). The polymers can be used singly or in combination with each other. Cationic acrylamide based polymers are the preferred polymers for use in combination with the present sols.

The amount of silica sol and polymer in the production of paper according to the present invention can vary within wide limits depending on, among other things, type of stock, presence of fillers and other conditions. The amount of sol should suitably be at least 0.01 kg/ton, calculated as $SiO_2$ on dry fibres and optional fillers, and is suitably within the range of from 0.05 to 5 kg/ton and preferably within the range from 0.1 to 2 kg/ton. The sol is suitably added to the stock at dry contents within the range of from 0.1 to 5 percent by weight. The amount of polymer is to a high degree dependent on the type of this and other effects desired from this. For synthetic polymers at least 0.01 kg polymer per ton, calculated as dry on dry fibres and optional fillers are usually used. Suitably amounts of from 0.01 to 3 and preferably from 0.03 to 2 kg per ton. are used. For polymers based on carbohydrates, such as cationic starch and cationic guar gum, amounts of at least 0.1 kg/ton, calculated as dry on dry fibres and optional fillers, are usually used. Suitably these are used in amounts of from 0.5 to 30 kg/ton and preferably from 1 to 15 kg/ton. The weight ratio of cationic polymer to sol, calculated as $SiO_2$, should usually be at least 0.01:1 and suitably at least 0.2:1. The upper limit for the polymer is first of all set by economical considerations and with regard to charges. For polymers of lower cationicity such as cationic starch, alone or in combination with other cationic polymers, very high amounts can thus be utilized, up to a ratio of 100:1 or higher, and the limit is mainly decided by economical reasons. Suitable ratios of cationic or amphoteric polymer to sol, calculated as $SiO_2$, for most systems is within the range of from 0.2:1 to 100:1. The present sols can of course be used in papermaking in combination with conventional paper additives such as hydrophobing agents, dry strength agents, wet strength agents etc..It is particularly suitable to use aluminium compounds in combination with the present sols and cationic polymers since it has been found that aluminium compounds can give a further improvement of retention and dewatering. Any for use in papermaking known aluminium compound can be used, for example alum, polyaluminium compounds, aluminates, aluminium chloride and aluminium nitrate. The amount of aluminium compound can also vary within wide limits and it is suitable to use the aluminium compound in a weight ratio to the sol, calculated as $SiO_2$, of at least 0.01:1 whereby the aluminium compound has been calculated as $Al_2O_3$. The ratio suitably does not exceed 3:1 and is preferably within the range from 0.02:1 to 1,5:1. The polyaluminium compounds can for example be polyaluminium chlorides, polyaluminium sulphates and polyaluminium compounds containing both chloride and sulphate ions. The polyaluminium compounds can also contain other anions than chloride ions, for example anions from sulphuric acid, phosphoric acid, organic acids such as citric acid and oxalic acid.

The silica sols and the polymers can be utilized in the production of paper from different kinds of stocks of cellulose containing fibres and the stocks should suitably contain at least 50 percent by weight of such fibres, based on dry material. The components can for example be used for stocks of fibres from chemical pulp, such as sulphate and sulphite pulp, thermomechanical pulp, refiner pulp or groundwood pulp from both hardwood and softwood and can also be used for stocks based on recycled fibres. The stock can also contain mineral fillers of conventional types, such as for example kaolin, titanium dioxide, gypsum, chalk and talcum. The terms paper and papermaking which are used herein do of course not include solely paper and its production but also other cellulose fibre containing products in sheet or web form such as pulp sheets, board and cardboard and their production.

The invention is further illustrated in the following examples which, however, are not intended to limit the same. Parts and percent relate to parts by weight and percent by weight unless otherwise stated.

EXAMPLE 1a)–1c)

In these examples different sols were prepared: 1a) Reference. Sol with S-value of about 53 containing non-aluminium modified silica particles having a specific surface area of 500 $m^2/g$. This sol corresponds to a commercial sol developed on basis of the European patent 41056. The sol was prepared according to the following:

1275 g of water glass with an $SiO_2$-content of 24.2% and a weight ratio $SiO_2$:$Na_2O$ of 3.45 was diluted with 4045 g of water to an $SiO_2$-content of 5.8%. The water glass solution was ion exchanged in a column filled with strong cation exchange resin (Amberlite IR 120) and diluted with water to 5.41% $SiO_2$. 4000 g of the ion exchanged water glass was charged to a reactor. While stirring well 354.2 g of water glass (5.8% $SiO_2$; $SiO_2$:$Na_2O$=3,45) were added to the ion exchanged water glass. The time of addition was about 15 seconds. The alkalized solution was then heated to 85° C. and heat treated at this temperature for 75 minutes. After finished heat treatment the sol was cooled.

1b) According to the invention. Sol with an S-value of 31 containing non-aluminium modified silica particles with a specific surface area of 545 $m^2/g$. The sol was prepared according to the following:

1625 of water glass with an $SiO_2$-content of 24.2% and a ratio $SiO_2$:$Na_2O$ of 3.45 were diluted with 4075 g of water to an $SiO_2$-content of 6.9%. The water glass solution was ion exchanged in an ion exchange column according to Ex. 1a) and the ion exchanged water glass was diluted to 6.49% $SiO_2$. 4600 g of the ion exchanged water glass were charged to a reactor vessel. While stirring well 400 g of water glass (6.9% $SiO_2$; $SiO_2$:$Na_2O$=3,45) were added to the ion exchanged water glass. The alkalized solution was then heated to 85° C. and heat treated at this temperature for 60 minutes. After finished heat treatment the sol was cooled.

1c) According to the invention. Sol with an S-value of 21 containing aluminium modified silica particles with a specific surface area of 631 $m^2/g$. The sol was prepared according to the following:

A diluted water glass solution ($SiO2$:$Na_2O$=3.4) was ion exchanged in a column and an ion exchanged water glass with an $SiO_2$ content of 5.36% was obtained. To 4000 g of this solution 80.6 g of water glass (22.2% $SiO_2$; $SiO_2$:$Na_2O$= 3,41) were added. The addition time was about 15 seconds. The alkalized solution was then heated to 75° C. and treated at this temperature for 120 minutes. The sol was cooled and then $H^+$-saturated cation exchange resin (Amberlite IR-120) was added in an amount to give a pH value of 7.2. The ion exchange resin was then filtered off. To 3770 g of the pH-adjusted sol 25.4 g of sodium aluminate ($Al_2O_3$-content 25.5%) were added. Before the addition the sodium aluminate had been diluted with 225 g of water. The pH adjusted sol was heated to 45° C. before the addition and the addition time for the aluminate was 60 minutes.

EXAMPLE 2

In this example the retention effect, retention of fibres and fillers, of sols 1a) and 1b) in production of paper was investigated. A standard stock, based on pulp with the composition 60% bleached birch sulphate +40% bleached pine sulphate to which had been added 30% of chalk as filler and 0.3 g/l of $Na_2SO_4.10H_2O$, was used. The stock had a concentration of about 5 g/l, a fine fraction content of 38% and a pH of 8.1.

The retention effect, in this and following examples, was evaluated by means of a Britt Dynamic Drainage Jar at 800 rpm. This is the conventional retention test method used in the paper industry. The sols were used in varying amounts in combination with a cationic acrylamide based polymer (Floerger Fp 4190 PG with 10 mole % cationic charges and a molecular weight of about 10 millions). The cationic polyacrylamide was in all tests added in an amount of 0.8 kg/t and it was added before the sol. All given dosages, in this and following examples, are calculated as dry on dry fibres and optional fillers. The results are shown in the following table.

| Sol 1a) Ref. kg/t | Sol 1b) kg/t | Retention % |
| --- | --- | --- |
| 0.3 | | 48.5 |
| 0.5 | | 51.9 |

-continued

| Sol 1a) Ref. kg/t | Sol 1b) kg/t | Retention % |
|---|---|---|
| 0.7 | | 53.9 |
| 1.0 | | 58.0 |
| 1.5 | | 61.9 |
| | 0.3 | 57.2 |
| | 0.5 | 63.7 |
| | 0.7 | 73.5 |
| | 1.0 | 76.1 |
| | 1.5 | 78.7 |

As evident a considerable improvement of the retention effect was obtained when the cationic polyacrylamide was used in combination with silica sol having high content of microgel, low S-value, according to the invention in comparison with the effect when it was used in combination with a commercial sol with low content of microgel.

EXAMPLE 3

In this example the retention was evaluated in the same manner as in Ex. 2 using sol c) according to the invention in comparison with a sol according to the PCT application WO 91/07350, sol d), which like sol c) had an S-value of 21 but which had particles with a specific surface area of 897 m²/g. The stock was a standard stock with a concentration of 5.2 g/l, a fines fraction content of 34% and a pH of 8.1. The same cationic polyacrylamide as in Ex. 2 was used and was added in an amount of 0.8 kg/t.

| Sol 1d) Ref. kg/t | Sol 1c) kg/t | Retention % |
|---|---|---|
| 0.2 | | 43.9 |
| 0.4 | | 58.5 |
| 0.8 | | 73.0 |
| | 0.2 | 47.5 |
| | 0.4 | 71.6 |
| | 0.8 | 72.1 |

As evident as good retention can be obtained with aluminium modified sols with low S-value and a specific surface area of the order 600 m²/g as with aluminium modified sols with corresponding low S-value but with particles having substantially larger surface area.

We claim:

1. Silica sols having an S-value within the range from 15 to 40 percent comprising anionic silica particles, said silica particles being non-aluminum modified, and having a specific surface area within the range of from 300 to 700 m²/g.

2. The silica sols of claim 1 wherein the silica particles have a specific surface area within the range of from 400 to 650 m²/g.

3. The silica sols of claim 1 wherein the sol has an S-value within the range of from 15 to 35 percent.

4. The silica sols of claim 1, wherein the sols have a dry content, calculated as $SiO_2$, of from 5 to 30 percent by weight.

5. A process for the production of paper, which comprises:
   (a) providing a suspension containing cellulose fibers, and optional fillers;
   (b) adding to said suspension a cationic or amphoteric polymer retention and/or dewatering aid, said polymer being added in an amount of at least 0.01 kg/ton, based on dry fibers and optional fillers;
   (c) adding to said suspension a silica sol comprising anionic silica particles, said silica particles being non-aluminum modified and having a specific surface area within the range of from 300 to 700 m²/g, said silica sol having an S-value within the range of from 15 to 40 percent, wherein said silica sol is added to the suspension in an amount of at least 0.01 kg/ton, calculated as $SiO_2$ on dry fibers and optional fillers; and
   (d) thereafter forming and dewatering the obtained suspension on a wire to form paper.

6. The process of claim 5 wherein the silica sol particles have a specific surface area within the range from 400 to 650 m²/g.

7. The process of claim 5, wherein the sol has an S-value within the range of form 15 to 35 percent.

8. The process of claim 5, wherein said polymer is a cationic acrylamide based polymer.

9. Silica sols having an S-value within the range of from 15 to 40 percent comprising anionic silica particles, said silica particles being aluminum modified and having a specific surface area within the range of from 300 to 700 m²/g.

10. The silica sols of claim 9, wherein the silica particles are surface modified with aluminum to a degree of from 2 to 25 percent substitution of silicon atoms.

11. The silica sols of claim 9, wherein the silica particles have a specific surface area within the range of from 400 to 650 m²/g.

12. The silica sols of claim 9, wherein the sol has an S-value within the range of from 15 to 35 percent.

13. The silica sols of claim 9, wherein the sols have a dry content, calculated as $SiO_2$, of from 5 to 30 percent by weight.

14. A process for the production of paper which comprises
   (a) providing a suspension containing cellulose fibers, and optional fillers;
   (b) adding to said suspension a cationic or amphoteric polymer retention and/or dewatering aid, said polymer being added in an amount of at least 0.01 kg/ton, based on dry fibers and optional fillers;
   (c) adding to said suspension a silica sol comprising anionic silica particles, said silica particles being aluminum modified and having a specific surface area within the range of from 300 to 700 m²/g, wherein said silica sol has an S-value within the range of from 15 to 40 percent and said silica sol is added to the suspension in an amount of at least 0.01 kg/ton, calculated as $SiO_2$ on dry fibers and optional fillers; and
   (d) thereafter forming and dewatering the obtained suspension on a wire to form paper.

15. The process of claim 14, wherein the silica sol particles have a specific surface area within the range of from 400 to 650 m²/g.

16. The process of claim 14, wherein the sol has an S-value within the range of from 15 to 35 percent.

17. The process of claim 14, wherein said polymer is a cationic acrylamide based polymer.

* * * * *